United States Patent [19]
Schriever

[11] 4,085,661
[45] Apr. 25, 1978

[54] DOUBLE WEDGE-LOCK CYLINDER HEAD
[75] Inventor: William W. Schriever, Orient, N.Y.
[73] Assignee: Edward D. Meyer, Cutchoque, N.Y.
[21] Appl. No.: 705,889
[22] Filed: Jul. 16, 1976
[51] Int. Cl.² ............................ F16J 15/18; F16J 11/02
[52] U.S. Cl. ....................................... 92/170; 92/128; 92/168
[58] Field of Search ................. 92/168, 128, 165, 170, 92/169, 166

[56] References Cited
U.S. PATENT DOCUMENTS

| 933,789 | 9/1909 | Sessions | 92/168 |
|---|---|---|---|
| 2,849,263 | 8/1958 | Johnson | 92/168 |
| 3,136,230 | 6/1964 | Buckley | 92/128 |
| 3,334,937 | 8/1967 | Jofeh | 92/165 R |
| 3,847,404 | 11/1974 | Agostino, Jr. | 92/165 R |

Primary Examiner—Paul E. Maslousky
Attorney, Agent, or Firm—Stevens, Davis, Miller & Mosher

[57] ABSTRACT

An hydraulic cylinder head is disclosed having a plurality of arcuate locking segments which engage a plurality of closely spaced circular grooves of approximately trapezoidal transverse cross-section in the internal wall of the cylinder and which abut the perimeter of the head to retain it in the cylinder. A truncated conical taper is provided in the internal wall of the cylinder beyond these grooves to aid in the installation of the piston packing.

26 Claims, 6 Drawing Figures

DOUBLE WEDGE-LOCK CYLINDER HEAD

This invention relates to an hydraulic cylinder head having arcuate locking segments which engage a plurality of grooves in the internal wall of the cylinder.

At the high working pressures now being employed, the stresses in the wall of an hydraulic cylinder may approach the elastic limit of the steel from which the wall is fabricated so that an important characteristic of an hydraulic cylinder head is its strength. Criteria for judging the strength of the cylinder heads in common use are best established by an examination of the stresses in the wall of an hydraulic cylinder under pressure.

If a hollow cylinder of uniform wall thickness is fitted with a head at each end and is subjected to internal hydraulic pressure, then there will be stresses in all three directions in the cylinder wall. A first stress will occur in a direction normal to the surface of the wall caused by the compression of the wall by the hydraulic pressure. For ordinary cylinders in which the wall thickness is small compared to the radius of the cylinder, this first stress is negligible compared to the other two. A second stress will occur in a direction normal to a plane containing the axis caused by the radial expansion of the cylinder as a direct result of the hydraulic pressure on the cylinder wall. And a third stress will occur in the direction of the axis caused by the stresses induced in the head by the hydraulic pressure being transferred to the cylinder wall. It can be shown that in magnitude the second stress is approximately twice the third stress.

For this reason, the average stress in the cylinder wall at the point where the head is attached to the cylinder can be limited to approximately half the maximum stress to which the cylinder wall is otherwise subjected by sealing the head to the cylinder in a separate location so that the hydraulic pressure is prevented from reaching the point at which the head is attached to the cylinder. When this is done, it is then possible to reduce the thickness of the cylinder wall at the point where the head is attached without causing premature failure if the stress at such point can be limited to twice the average stress in the original cylinder wall.

The hydraulic cylinder heads in common use differ primarily in the means by which the head is attached to the end of the cylinder. One common means of attaching a head to a cylinder is by means of a collar welded to the end of the cylinder. This collar must be strong enough to withstand the stresses concentrated by the fastening devices, usually bolts, and rigid enough to distribute these stresses in such a manner that the maximum stress at any point in the cylinder wall is limited to twice the average stress. This necessarily results in a massive head which is certainly expensive to fabricate and may be difficult to provide with the necessary clearance in the structure of the machine for which it is being designed.

A second common means of attaching a head to a cylinder is by means of a collar which engages threads on the external wall of the cylinder. Not only does this result in a massive head but, in addition, the threads may be difficult to engage without cross-threading. And further, the standard threads commonly used convert the axial forces on the collar to radial forces which may so expand the collar that the threads will strip.

A third means of attaching a head to a cylinder is that shown in U.S. Pat. No. 3,847,404 to Agostino, Jr. Wedge-shaped arcuate locking segments engage a single groove and abut the perimeter of the head to retain it in the cylinder. As compared to the two previous examples, this head is more easily assembled and disassembled and may be made somewhat more compact. However, the locking segments are not restrained from rotating in the groove, and thus the force is concentrated at the toe of the lip formed by the groove. Not only does this concentrate the stresses in the side-wall of the groove, but it applies a large moment to the cylinder wall which causes a high stress in the cylinder wall at the bottom of the groove. In order to limit these stresses, a heavy collar must be welded to the end of the cylinder.

A fourth means of attaching a head to a cylinder is that shown in U.S. Pat. No. 3,722,374 to Densmore. Again arcuate locking segments engage a single groove and abut the perimeter of the head to retain it in the cylinder. Because the head must be inserted deeply into the cylinder and then retracted to retain the segments in place, this head is not as easily assembled or disassembled as the third example. And since the cylinder bore is not enlarged in the area of the groove, great difficulty will be experienced in inserting the piston packing into the cylinder beyond the groove. But this design is significant in that it does provide a means of restraining the segments from rotating in the groove and thus achieves a more uniform distribution of the stresses in the side-wall of the groove.

A fifth means of attaching a head to a cylinder is that shown in U.S. Pat. No. 3,136,230 to Buckley. Arcuate locking segments engaging several grooves and abutting the perimeter of the head are shown in the disclosure. Again, because the head must be inserted deeply into the cylinder and then retracted to retain the segments in place, this head precludes the use of a taper in the inner wall of the cylinder beyond the grooves to restrain the inward motion of the head and to assist in the assembly of the piston packing into the cylinder.

A more detailed analysis shows that any means of attaching a head to a cylinder which involves arcuate locking segments engaging a single groove in the cylinder wall must fail before the cylinder. Since the steel in the wall has essentially the same strength in compression as in tension, the optimum depth for the single groove is one-half the thickness of the cylinder wall. This reduction in wall thickness alone will result in a doubling of the average stress in the cylinder wall at the bottom of the groove, and from the previous analysis of the stresses in a cylinder wall, this average stress will then be the maximum allowable. And since a uniform distribution of the stresses in the cylinder wall at the bottom of the groove cannot be achieved because the forces are not colinear, it follows that the head will fail before the cylinder.

The present invention provides arcuate locking segments engaging two or more grooves in the cylinder wall. If two grooves are provided, and analysis shows that the required total side-wall area of the grooves can be achieved with depths of only one-fourth the thickness of the cylinder wall. As a consequence, the average stress in the cylinder wall at the bottom of the grooves is reduced to two-thirds of that for a single groove. This leaves sufficient margin to accommodate a concentration of the stresses in the cylinder wall as high as one and one-half times the average stress.

Inherent in the design of the locking segments of this invention is the restraint required to prevent the locking segments from rotating in the grooves thus assuring a relatively uniform distribution of the stresses in the side-walls of the grooves.

And a further analysis of this invention shows that the transverse separation of the non-colinear forces is reduced to approximately one-half that of a single groove as is the moment applied to the cylinder wall. Hence, there is a significant improvement in the uniformity of the stress distribution in the cylinder wall at the bottom of the grooves.

The increased strength of the hydraulic cylinder head of this invention is achieved primarily by the combination of these three factors. And this strength can be increased further by means of an annular cap having a lip which engages the external wall of the cylinder and supports the moment applied to the cylinder wall by the locking segments.

It is a primary object of this invention to devise an hydraulic cylinder head of increases strength which is achieved primarily by a more uniform distribution of the stresses in the cylinder wall.

It is another object of this invention to devise an hydraulic cylinder head of increased rigidity which is achieved primarily by reducing the moments applied to the cylinder wall.

It is a further object of this invention to devise an hydraulic cylinder head of compact size which is achieved by attaching the cylinder head directly to the internal wall of the cylinder thus eliminating the need for any external collar.

It is still another object of this invention to devise an hydraulic cylinder head providing easy entry of the piston packing into the cylinder which is achieved by means of a truncated conical taper in the internal wall of the cylinder.

It is yet another object of this invention to devise an hydraulic cylinder head that is easily assembled and disassembled which is achieved by employing arcuate locking segments to retain the head in the cylinder.

It is a final object of this invention to devise an hydraulic cylinder head that is inexpensive to fabricate which is achieved by attaching the cylinder head directly to the cylinder wall thus eliminating the need for a collar on the end of the cylinder.

The present invention is an hydraulic cylinder head having a plurality of arcuate locking segments which engage a plurality of closely spaced grooves of approximately trapezoidal cross-section in the internal wall of the cylinder and which abut at least a major portion of the perimeter of the exterior surface of the cylinder head to retain it in the cylinder. The trapezoidal cross-section of the grooves assists in the assembly and disassembly of the locking segments and provides them with a wedging effect against the head. To further assist in the assembly and disassembly of the locking segments, a bolt is provided for each locking segment which serves as a means of drawing the segment into the grooves and also of tapping it loose.

To restrain the head within the cylinder a truncated conical taper is provided in the internal wall of the cylinder to the interior of these grooves. This taper provides an abutting surface for a corresponding taper on the head and aids in the installation of the piston packing in the cylinder.

To retain the locking segments in place a ring is provided which engages the inner circumference of these locking segments. In a preferred embodiment of this invention, this ring engages the locking segments in a truncated conical taper which assures a tight fit and assists in the engagement of the ring. In a further improvement, this ring is provided by a concentric projection from an annular cap which protects the end of the cylinder from damage and improves its appearance. In still another improvement, the annular cap is provided with a lip which engages the circumference of a portion of the external wall of the cylinder thus supporting the moment in the cylinder wall and thereby increasing the strength of the hydraulic cylinder head.

This invention is more readily apparent by reviewing the drawings wherein

Figure 2:
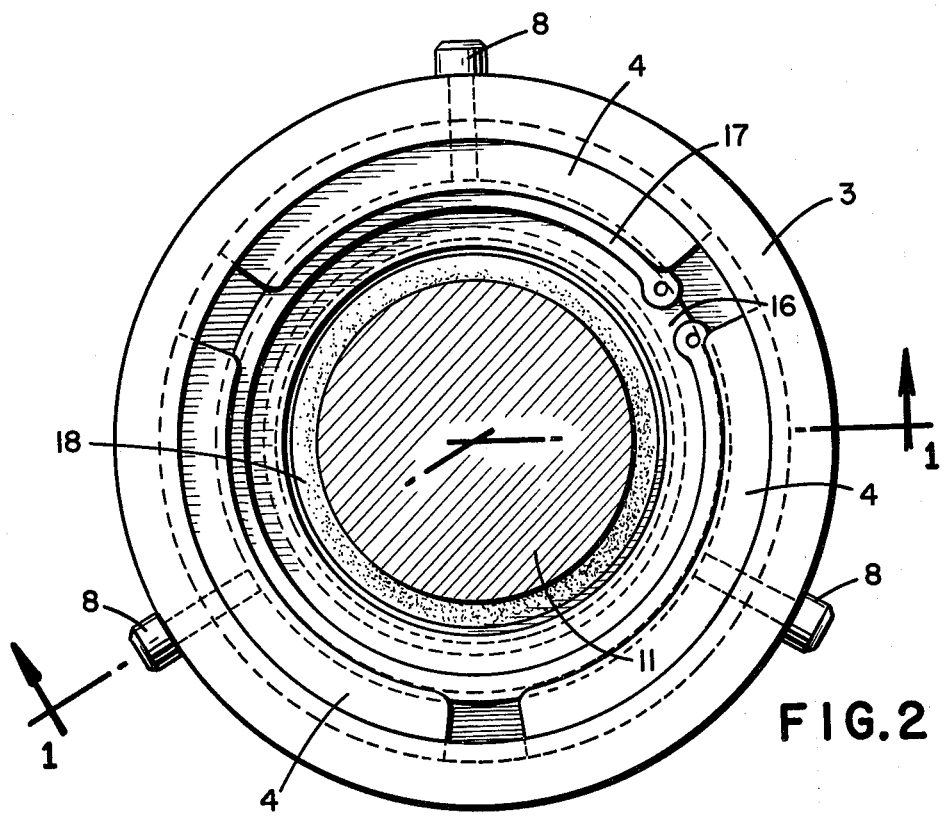
FIG. 2 is an end view of the hydraulic cylinder head of FIG. 1.

Referring now more specifically to the drawings, the head 2, ordinarily made of solid metal, is retained in the bore of the cylinder 3 by three metal wedge-shaped arcuate locking segments 4 which abut the perimeter of the head in a spaced symmetrical configuration. These locking segments 4 engage two closely spaced grooves 5 machined in the internal wall of the cylinder 3 to a depth of about one-fourth the thickness of the cylinder wall. The two grooves 5 are of trapezoidal transverse cross-section thus providing a truncated conical taper 6 of about 5° from radial in the side-wall of each groove that is nearer to the end of the cylinder. The locking segments 4 engage the grooves 5 by means of interlocking projections 7 having an identical transverse cross-section so that the tapered surfaces 6 assure a tight fit of the locking segments 4 in the grooves 5 and also wedge the locking segments 4 against the perimeter of the head 2. To assist in the assembly and disassembly of the hydraulic cylinder head, each locking segment 4 is provided with a bolt 8 which passes through a clearance hole in the cylinder wall and threads into a hole in the locking segment 4. This bolt 8 serves as a means of drawing the locking segments 4 into the grooves 5 and of tapping them loose. A truncated conical taper 9 of about 15° from axial is provided on the internal wall of the cylinder 3 to the interior of the grooves 5. This taper 9 provides an abutting surface for a corresponding taper on the head 2 and aids the installation of the piston packing in the cylinder. A sealing means 10, shown in these drawings as an O-ring, is provided to prevent leakage of operating fluid between the head 2 and the cylinder 3. An actuating rod 11 slidably engages the internal wall of a cylindrical bushing 12 made of a soft metal such as bronze and designed to protect the surface of the actuating rod 11 from wear. Bushing 12 is retained in an axial bore in the head 2 against shoulder 13 by a lock-ring 14 which engages a groove in the circumference of the bore. A packing 15, shown here as a U-cup, is retained in an adjacent bore in the head 2 by the bushing 12 and prevents leakage of operating fluid between the actuating rod 11 and the head 2.

Figure 1:
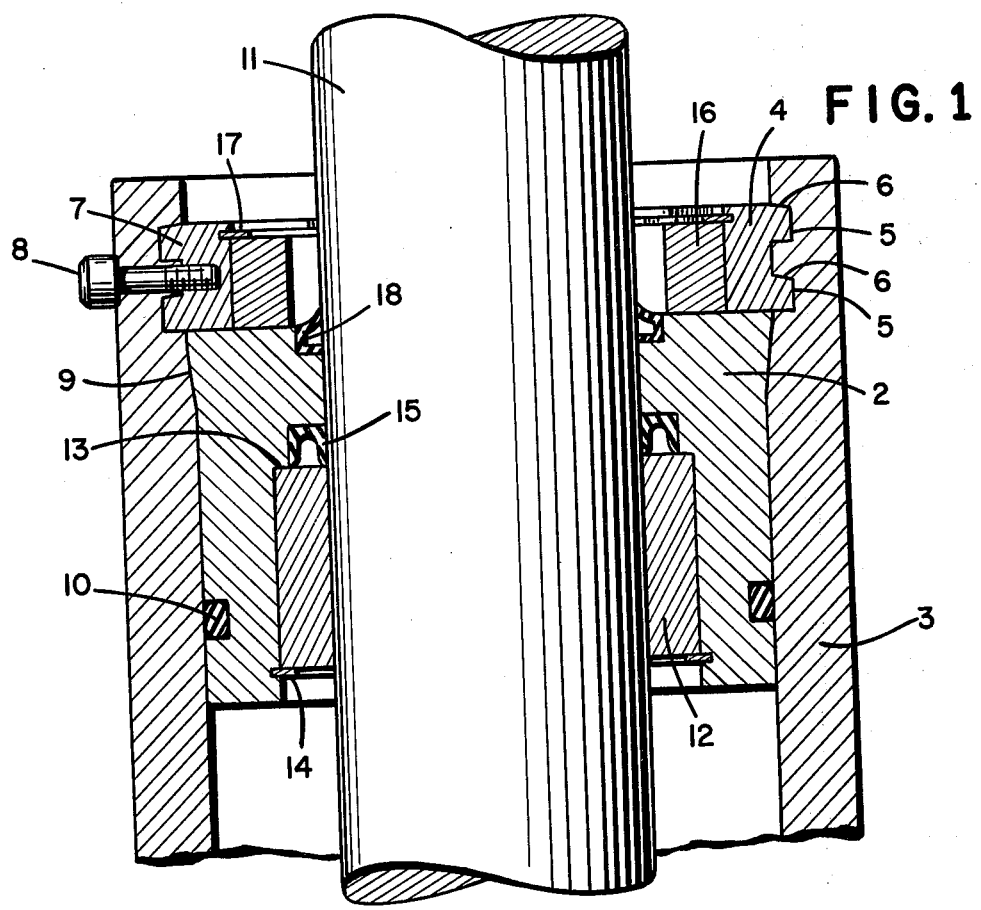
FIG. 1 is a longitudinal cross-sectional view of an embodiment of my invention in which an actuating rod is engaged in an axial bore in the head.

In the embodiment of this invention shown in FIG. 1 and FIG. 2, the locking segments 4 are held outwardly against the grooves 5 by a cylindrical retainer ring 16 which removably engages the inner circumference of the locking segments 4 and abuts the head 2. A lock-ring 17 holds the retainer ring 16 in place by engaging a groove in the inner circumference of the locking segments 4 and abutting the retainer ring 16. The lock-ring is made of spring-steel. Also provided in this embodiment is a wiper 18 which is held in a shallow recess in the exterior surface of the head 2 and slidably engages the circumference of the actuating rod 11. This wiper 18 is made of elastic material such as plastic and serves as a means of removing dirt from the surface of the actuating rod 11 as it is drawn into the cylinder head 2 in the operation of the hydraulic cylinder.

Figure 4:
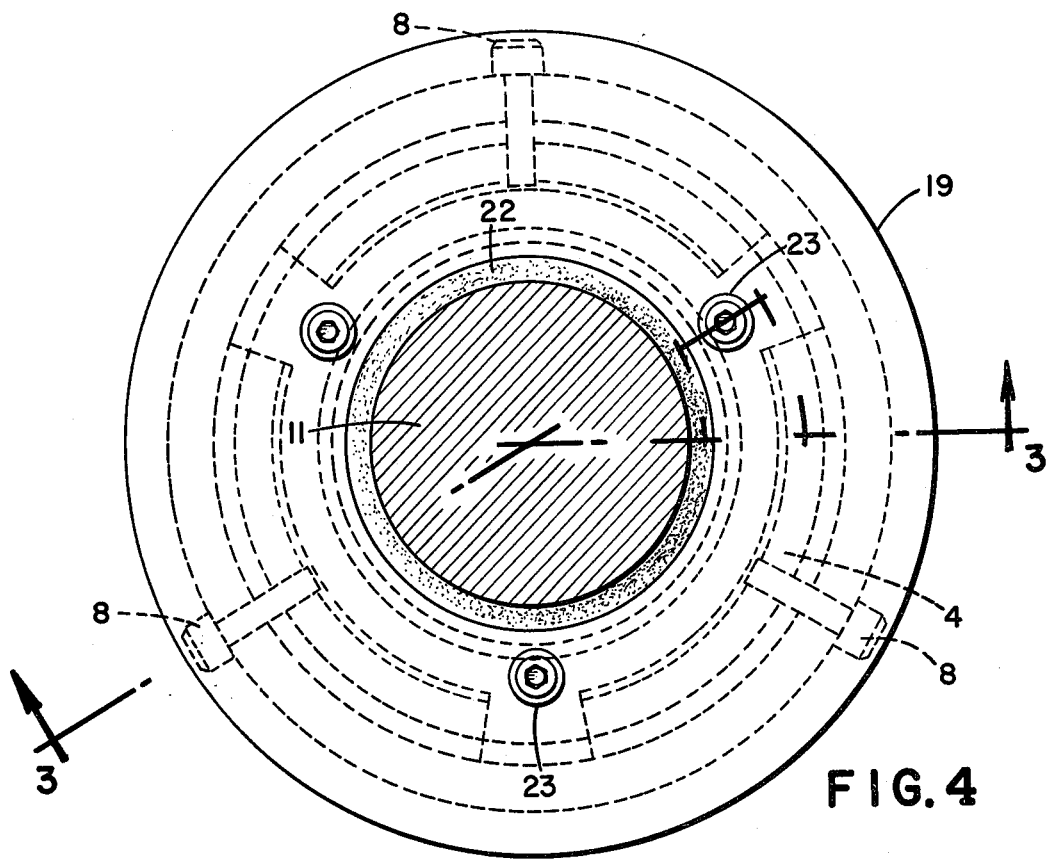
FIG. 4 is an end view of the hydraulic cylinder head of FIG. 3.
Figure 3:
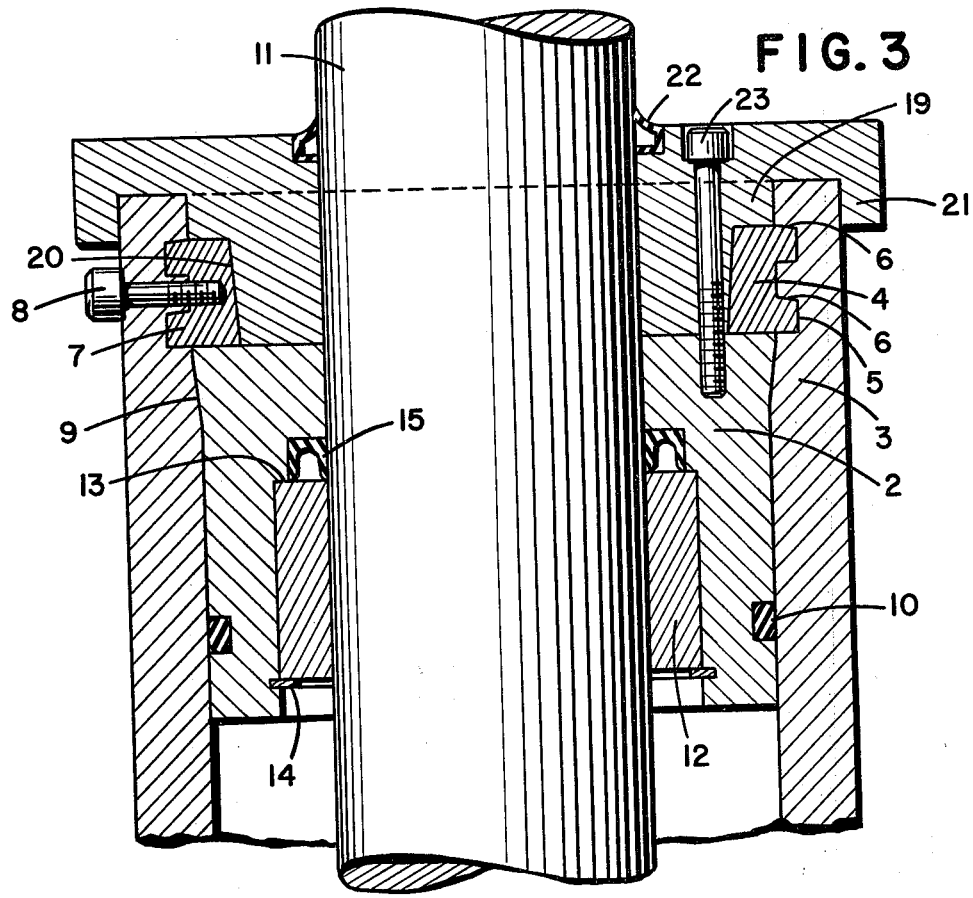
FIG. 3 is a longitudinal cross-sectional view of a preferred embodiment of my invention showing an annular cap with a lip that engages the external wall of the cylinder.

In the preferred embodiment of this invention shown in FIG. 3 and FIG. 4, an annular cap 19 is provided to protect the hydraulic cylinder head from damage and to improve its appearance. The locking segments 4 are held outwardly against the grooves 5 by a concentric projection on the annular cap 19 which engages the inner circumference of the locking segments 4 in a truncated conical taper 20. This taper 20 assures a tight fit of the locking segments 4 in the grooves 5 and assists in engaging the cap 19 in the locking segments 4. The annular cap 19 is also provided with a lip 21 which engages the circumference of a portion of the external wall of the cylinder 3 and supports the moment applied to the cylinder wall by the locking segments 4. In addition, the lip 21 provides a convenient means of removing the annular cap 19 in the disassembly of the hydraulic cylinder head. A wiper 22 is held in a shallow recess in the exterior surface of the annular cap 19 and slidably engages the circumference of the actuating rod 11. This wiper 22 is made of an elastic material such as plastic and serves as a means of removing dirt from the surface of the actuating rod 11 as it is drawn into the cylinder head 2 in the operation of the hydraulic cylinder. The annular cap 19 is retained in the end of the cylinder 3 by three bolts 23 which pass through clearance holes in the main body of the annular cap 19 and thread into blind holes in the body of the head 2. The bolts 23 shown in this preferred embodiment have Allen heads which are flush with the exterior surface of the annular cap 19 thus protecting them from damage and presenting an improved appearance.

The number of wedge-shaped arcuate locking segments used in the hydraulic cylinder head, shown here as three, can vary with three preferred. The locking segments may be symmetrically spaced around the perimeter of the head as shown, or they may be so designed as to form a continuous ring when assembled within the cylinder.

The number of grooves machined into the internal wall of the cylinder to receive the locking segments, shown here as two, can vary with two sufficient and preferred.

Although the description of this invention refers to the head being attached directly to the cylinder wall, obviously a collar could be provided on the end of the cylinder for this purpose.

And the hydraulic cylinder head shown in these embodiments can be adapted to close the end of the hydraulic cylinder opposite that from which the actuating rod protrudes by eliminating the axial bore in the head. Further, a clevis eye may be attached to this modified head to anchor the cylinder to the structure of the machine for which it is being designed.

Figure 6:
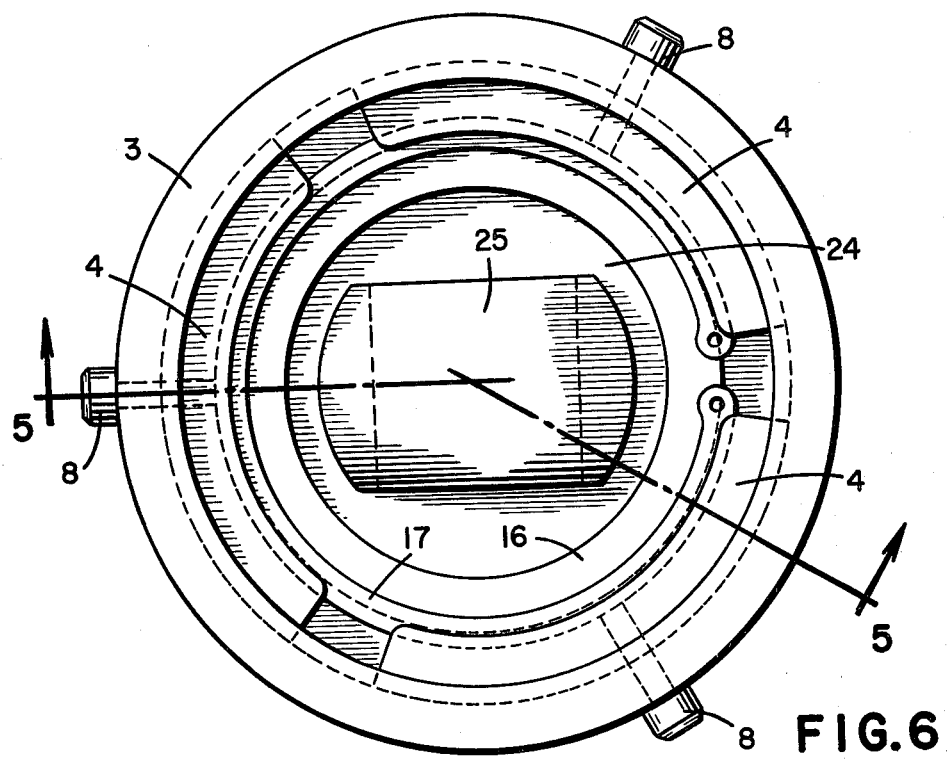
FIG. 5 is a partial longitudinal section of an embodiment for closing the end of the hydraulic cylinder opposite that from which the actuating rod protrudes and FIG. 6 is an end view of the embodiment shown in FIG. 5.
Figure 5:
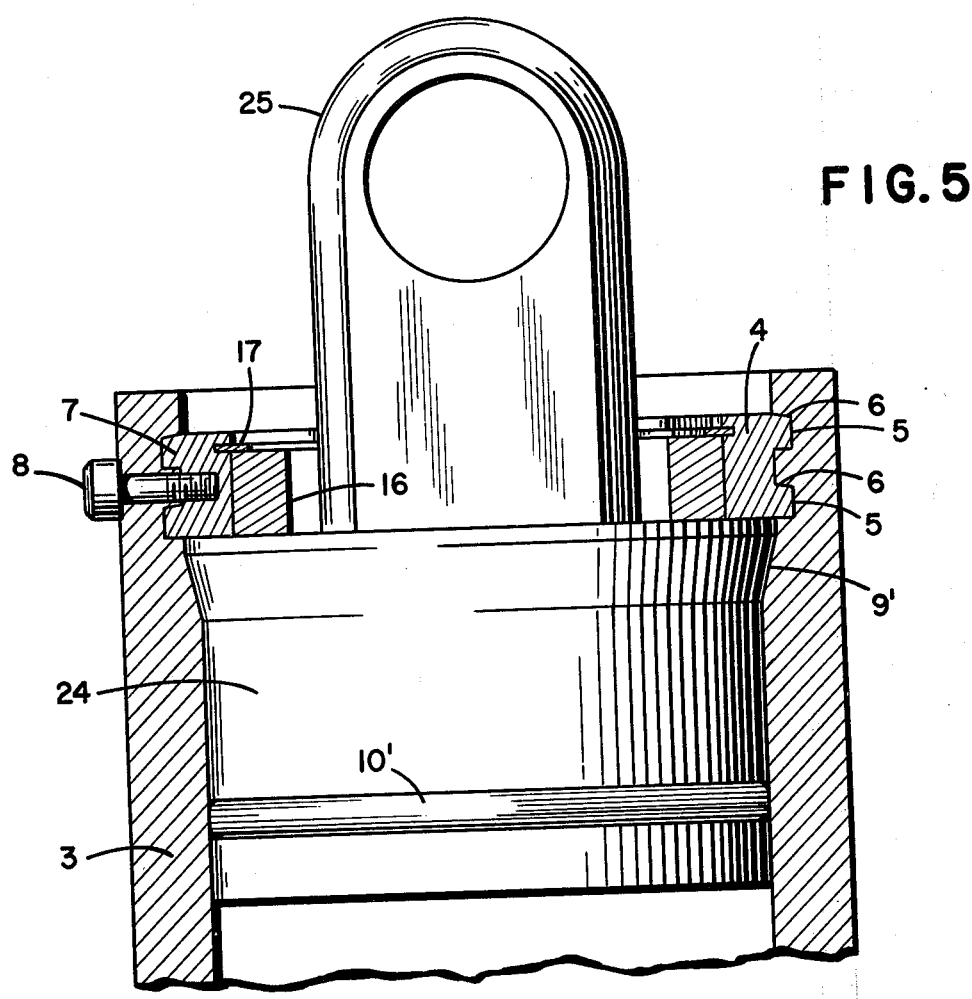

This is shown in FIG. 5 and FIG. 6 wherein a modified head 24 has a clevis eye 25 attached thereto to permit anchoring the cylinder. Here the modified head is held in place in a fashion similar to the means employed to anchor the head in place at the other end of the cylinder. Arcuate locking segments 4 engage grooves 5 machined into the internal wall of the cylinder and having a truncated conical taper 6. Interlocking projections 7 are used to engage the locking segments with the grooves and the projections have identical transverse cross-sections to assure a tight fit of the locking segments in the grooves and to wedge the locking segments against the perimeter of the modified head. Bolts 8 passes through a clearance hole in the wall of the cylinder and threads into a hole in locking segment 4. Truncated conical taper 9 provides on the internal wall of the cylinder 3 gives an abutting surface for a corresponding taper on the modified head. Leakage of operating fluid between the modified head and the cylinder is prevented by the presence of sealing means 10, depicted as an O-ring. Lock-ring 17 will hold retainer ring 16 by engagement with a groove in the inner circumference of locking segment 4.

Having described the subject invention, it is of course apparent that further refinements and embodiments can be made within the scope of the contemplated invention which is set forth in the appended claims.

What I claim is:

1. An hydraulic cylinder construction comprising
a hollow cylinder having an internal wall provided with a plurality of closely spaced circular grooves in the internal wall near an end each to a depth less than one-half the thickness of the cylinder,
a head slidably fitted with said cylinder and to the interior of said plurality of grooves,
a restraining means to limit further entry of said head into said cylinder, said restraining means being provided by a truncated conical taper in said internal wall to the interior of said plurality of grooves, a portion of said head being tapered accordingly to provide an abutting surface,
a sealing means to prevent leakage of operating fluid between said head and said cylinder,
a plurality of arcuate locking segments engaged in said grooves and abutting at least a major portion of the perimeter of the exterior surface of said head, and
a retaining means separate from said head to hold said locking segments in place.

2. The hydraulic cylinder construction of claim 1 further comprising an axial bore in said head, a cylindrical actuating rod slidably engaging a portion of said bore, and a packing to prevent leakage of operating fluid between said head and said rod.

3. The hydraulic cylinder construction of claim 2 further comprising a wiper of pliable elastic material concentrically disposed and interconnectingly fitted to said head to the exterior of said packing and slidably engaging a circumference of said rod.

4. The hydraulic cylinder construction of claim 2 further comprising a cylindrical bushing of soft metal interconnectingly fitted to said head within a concentric cylindrical recess in said bore and providing the said slidably engaging portion of said bore.

5. The hydraulic cylinder construction of claim 4 further comprising a lock-ring abutting said bushing and retaining said bushing in place against an abutting shoulder, said lock-ring removably engaging a groove in the inner circumference of said recess.

6. The hydraulic cylinder construction of claim 4 wherein said packing is retained in an adjacent cylindrical recess in said bore by said bushing.

7. The hydraulic cylinder construction of claim 2 wherein said packing is a U-cup.

8. The hydraulic cylinder construction of claim 1 wherein each groove of said plurality of grooves is of an approximately trapezoidal transverse cross-section with each side wall nearer the end of said cylinder provided with a truncated conical taper and with said locking segments tapered accordingly for an interconnecting fit.

9. The hydraulic cylinder construction of claim 5 wherein said taper measures about 5° from radial.

10. The hydraulic cylinder head of claim 1 further comprising a bolt passing through a clearance hole in the wall of said cylinder and threaded into a hole in each of said locking segments.

11. The hydraulic cylinder head of claim 1 wherein said retaining means is a ring removably engaging the inner circumference of said locking segments.

12. The hydraulic cylinder head of claim 11 wherein said ring is provided with a truncated conical taper on its outer circumference and said locking segments are tapered on their inner circumference accordingly for a tight fit.

13. The hydraulic cylinder head of claim 11 wherein said ring is made as a coaxial projection from an annular cap removably engaging said cylinder wall as well as the inner circumference of said locking segments.

14. The hydraulic cylinder head of claim 13 wherein said cap is provided with a lip removably engaging the circumference of a portion of the external wall of said cylinder.

15. The hydraulic cylinder head of claim 13 wherein said cap is attached to said head with bolts passing through clearance holes in said cap and threaded into blind holes in said head.

16. The hydraulic cylinder head of claim 15 wherein said bolts are flush with the top of said cap.

17. The hydraulic cylinder construction of claim 15 wherein said restraining means are said cap and said bolts.

18. The hydraulic cylinder construction of claim 13 further comprising an axial bore in said head, a cylindrical actuating rod slidably engaging a portion of said bore, a packing to prevent leakage of operating fluid between said head and said rod, and a wiper of pliable elastic material concentrically disposed and interconnectingly fitted to said cap and slidably engaging a circumference of said rod.

19. The hydraulic cylinder construction of claim 11 further comprising a lock-ring abutting said ring and maintaining said ring in place, said lock-ring removably engaging a groove in the inner circumference of said locking segments.

20. The hydraulic cylinder construction of claim 11 wherein said retaining means is a metal ring.

21. The hydraulic cylinder construction of claim 1 wherein said plurality of grooves number two.

22. The hydraulic cylinder construction of claim 1 wherein said plurality of locking segments number three.

23. The hydraulic cylinder construction of claim 1 wherein said locking segments are symmetrically spaced around the circumference.

24. The hydraulic cylinder construction of claim 1 wherein said taper measures about 15° from axial.

25. The hydraulic cylinder construction of claim 1 wherein said sealing means is an O-ring.

26. The hydraulic cylinder construction of claim 1 wherein said hollow cylinder, said head, and said arcuate locking segments are metal.

* * * * *